United States Patent
Freudenberg et al.

(10) Patent No.: US 7,338,036 B2
(45) Date of Patent: Mar. 4, 2008

(54) SWITCHABLE ASSEMBLY BEARING WITH HYDRAULIC DAMPING

(75) Inventors: Tillmann Freudenberg, Furth (DE); Erhard Moog, Gorxheimertal (DE)

(73) Assignee: Carl Freudenberg, KG (DE)

( * ) Notice: Subject to any disclaimer, the term of this patent is extended or adjusted under 35 U.S.C. 154(b) by 149 days.

(21) Appl. No.: 10/506,369

(22) PCT Filed: Mar. 26, 2003

(86) PCT No.: PCT/EP03/03124

§ 371 (c)(1),
(2), (4) Date: May 12, 2005

(87) PCT Pub. No.: WO03/081080

PCT Pub. Date: Oct. 2, 2003

(65) Prior Publication Data

US 2005/0218571 A1    Oct. 6, 2005

(30) Foreign Application Priority Data

Mar. 27, 2002  (DE) .................................. 102 13 996

(51) Int. Cl.
*F16F 15/00* (2006.01)
(52) U.S. Cl. ................................. 267/140.15
(58) Field of Classification Search ................ 267/140.11–140.15
See application file for complete search history.

(56) References Cited

U.S. PATENT DOCUMENTS

| 4,583,723 A | | 4/1986 | Ozawa |
| 4,635,910 A | * | 1/1987 | Ozawa et al. .......... 267/140.14 |
| 4,872,652 A | * | 10/1989 | Rohner et al. ......... 267/140.14 |
| 5,947,456 A | * | 9/1999 | Aoki ..................... 267/140.14 |
| 6,921,067 B2 | * | 7/2005 | Gries et al. ............ 267/140.14 |

FOREIGN PATENT DOCUMENTS

| DE | 198 61 063 A1 | 1/2000 |
| DE | 100 17 634 A1 | 10/2001 |
| JP | 63 030 623 | 2/1988 |
| JP | 63030623 A | * 2/1988 |

* cited by examiner

*Primary Examiner*—Xuan Lan Nguyen
(74) *Attorney, Agent, or Firm*—Harness, Dickey & Pierce, P.L.C.

(57) ABSTRACT

The invention relates to a switchable assembly bearing that comprises at least one working chamber and one compensation chamber which are separated by a dividing wall. The working chamber and compensation chamber are hydraulically interconnected by means of a damping channel, in addition to at least one other damping channel which can be closed by means of the sealed arrangement of a shut-off body which can be displaced along a displacement path. The other damping channel is formed and arranged in relation to the axis of symmetry of the bearing in such a way that the forces acting on the shut-off body by means of the hydraulic fluid counterbalance each other.

14 Claims, 2 Drawing Sheets

SWITCHABLE ASSEMBLY BEARING WITH HYDRAULIC DAMPING

CROSS-REFERENCE TO RELATED APPLICATIONS

This application is a National Stage of International Application No. PCT/EP03/03124, filed Mar. 26, 2003. This application claims the benefit of German Patent Application 102 13 996.2, filed Mar. 27, 2002. The disclosures of the above applications are incorporated herein by reference.

FIELD OF THE INVENTION

The invention relates to a switchable assembly bearing with hydraulic damping, particularly for supporting drive assemblies and/or gearbox assemblies in motor vehicles. The bearing comprises at least one working chamber and one compensation chamber that are separated from one another by a dividing wall. The working chamber and compensation chamber are interconnected hydraulically by means of a damping channel, and at least one additional damping channel that can be closed by means of a shut-off body displaceable along a displacement path. The shut-off body is capable of providing a seal in cooperation with an associated seat.

DESCRIPTION OF THE PRIOR ART

An assembly bearing is known from, for example, DE 198 61 063 C2. The known assembly bearing has a working space and a compensation space with a dividing wall disposed between them. Moreover, between the working space and the compensation space the known assembly bearing comprises a damping channel for damping low-frequency, high-amplitude vibrations. For isolating high-frequency, low-amplitude vibrations there is provided a membrane disposed in a recess and capable of moving back and forth in the direction of the vibrations introduced. In addition, the known assembly bearing is provided centrally within the dividing wall with an aperture that can be closed in a sealing manner by means of a shut-off body that is displaceable within the bearing and cooperates with an associated seat in the dividing wall.

In an axial direction, the dividing wall consists of two parts and forms a membrane cage. The membrane is disposed within the membrane cage. The membrane is made of an elastomeric material, is circular in shape and has a central recess corresponding to the aperture.

For quenching of vibrations caused during the idling of an attached internal combustion engine, the sealing body is removed from the aperture by downward axial displacement so that the liquid column can move within the aperture out of phase relative to the vibrations caused by the idling. This produces a quenching effect.

During the operation of the internal combustion engine above the idling rotational speed, the aperture is closed by the sealing body, and under these operating conditions the bearing of the invention functions as do the generally known hydraulically damping bearings, in which, to isolate high-frequency, low-amplitude engine-induced vibrations, the membrane is disposed within the dividing wall so that it can move back and forth. For the damping of low-frequency, high-amplitude, roadway-induced vibrations, the damping liquid contained within the damping channel vibrates back and forth in an out-of-phase manner.

A drawback of the known assembly bearing, however, is that the central aperture strongly reduces the surface area available for the membrane. This has a deleterious effect on the damping of low-amplitude, high-frequency acoustic vibrations. Moreover, in the central aperture the sealing body must be able to resist or move against the increased pressure in the working space, which requires higher displacement forces. Other drawbacks are the complicated design of the known assembly bearing and the large dimensions thereof.

SUMMARY OF THE INVENTION

An object of the present invention is to further develop an assembly bearing in a manner such that it will be of simpler design and require a smaller mounting space and, in addition, reduced displacement forces for idling.

The present invention makes use in simple manner of the symmetry of an assembly bearing relative to its long axis. According to the invention, a switchable assembly bearing with hydraulic damping, particularly for the support of drive assemblies and/or gearbox assemblies in motor vehicles, is provided that comprises at least one working chamber and one compensation chamber that are separated by a dividing wall. The working chamber and compensation chamber are hydraulically interconnected through a damping channel, and at least one additional damping channel that can be closed by a shut-off body displaceable along a displacement path and cooperating with an associated seat. The additional damping channel is configured and disposed relative to the symmetry axis of the bearing so that the forces acting on the shut-off body through the hydraulic liquid counterbalance each other. This has the advantage that substantially lower displacement forces are needed to displace the shut-off body and, as a result, the assembly bearing can be of small and compact design.

In an advantageous embodiment of the invention, the damping channel is formed in a simple manner as an annular slot that extends radially around the aperture between the working chamber and the compensation chamber, with a passage opening disposed radially relative to the symmetry axis toward a corresponding annular slot-like connecting chamber that leads to the compensation chamber. In this embodiment, the shut-off body is formed by a sealing ring displaceable back and forth along a displacement path that extends vertical to the flow-through direction, namely parallel to the bearing axis, between an opening position and a closing position. With such a technical arrangement, by making use of the symmetry of the assembly bearing, it is possible to achieve virtual compensation of the forces acting on the shut-off body. Such forces are a result of a pressure build-up in the working chamber. These forces act generally on the sealing ring in the direction vertical to the displacement path and counterbalance each other. On the side of the compensation chamber, a pressure build-up that could produce troublesome forces is largely prevented by the connection with the compensation chamber which at the bottom is limited by air bellows capable of absorbing volume without generating pressure.

In addition to the fact that the damping channel is designed as an annular slot and the shut-off body as a sealing ring, it is also possible to make use of several passage openings disposed diametrically opposite each other and whose shut-off bodies are operationally connected with each other. In such an arrangement, too, by making use of the symmetry, nearly complete force compensation can be achieved.

In a particularly preferred embodiment of the invention, the chamber providing the connection to the compensation chamber is attached to the additional damping channel in a radially outward direction. This has the advantage that the entire inner surface of the dividing wall is available for the placement of the membrane.

Because, as a result of extensive force compensation, only slight displacement forces are needed, magnetic forces can be used to actuate the shut-off body or the sealing ring. To this end, the shut-off body or the sealing ring are advantageously provided with a permanently magnetic material, and a device is provided for generating the appropriate switching magnetic fields.

The device for generating magnetic fields is preferably an electromagnet.

When the additional damping channel is in the form of an annular slot and the shut-off body in the form of a sealing ring, the electromagnet is advantageously, at least in segments, in the form of a ring corresponding to the sealing ring.

In an especially simple space-saving design, the electromagnet is disposed in a chamber adjacent to the chamber connecting with the compensation space containing the shut-off body.

In another particularly preferred embodiment of the invention, the shut-off body or the sealing ring consists of a magnetic elastomer. The density of elastomers is preferably in the range of the density of the damping liquid so that as a result of this measure the displacement forces for the shut-off body are further reduced.

The required mounting space is further minimized when the damping channel is at least partly disposed in the dividing wall between the working chamber and the compensation chamber.

In particular, the additional damping channel is sized so that it is suitable for decoupling and quenching low-frequency, high-amplitude vibrations of an idling drive assembly.

If, besides the first and the additional damping channel, the switchable assembly bearing of the invention is provided with yet another known decoupling device for quenching and damping high-frequency, low-amplitude acoustic vibrations, the switchable assembly bearing of the invention combines in itself all advantages of an idling switchable bearing in itself known, but in contrast to the known versions is characterized by a simple design, compact construction and low energy requirements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

In the following, the invention will be explained in greater detail by reference to the drawings in which.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
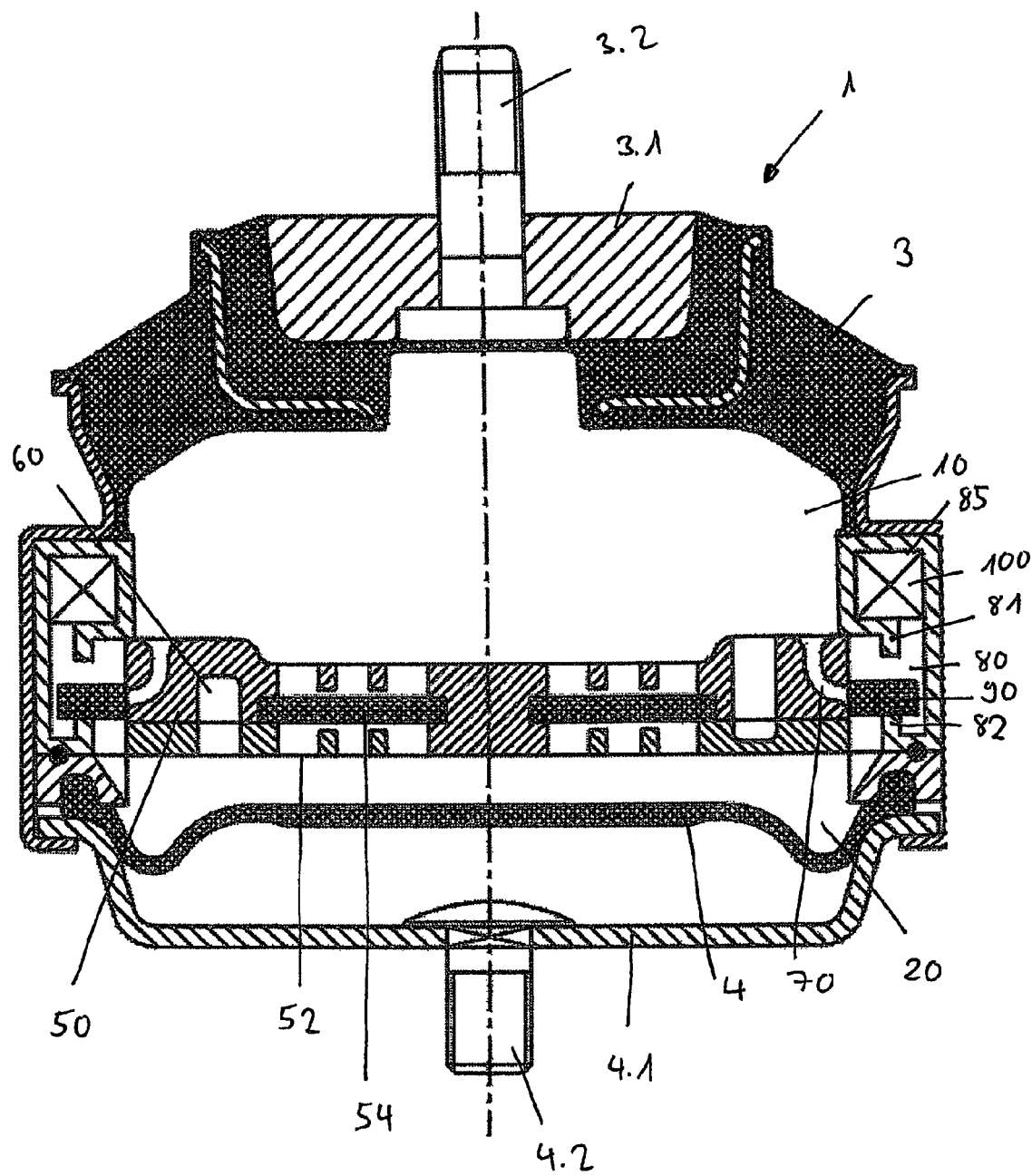
FIGS. 1a and 1b show a schematic representation of a longitudinal section of a preferred embodiment of a switchable assembly bearing in the closed position (a) and with the additional damping channel open (b).
Figure 1B:
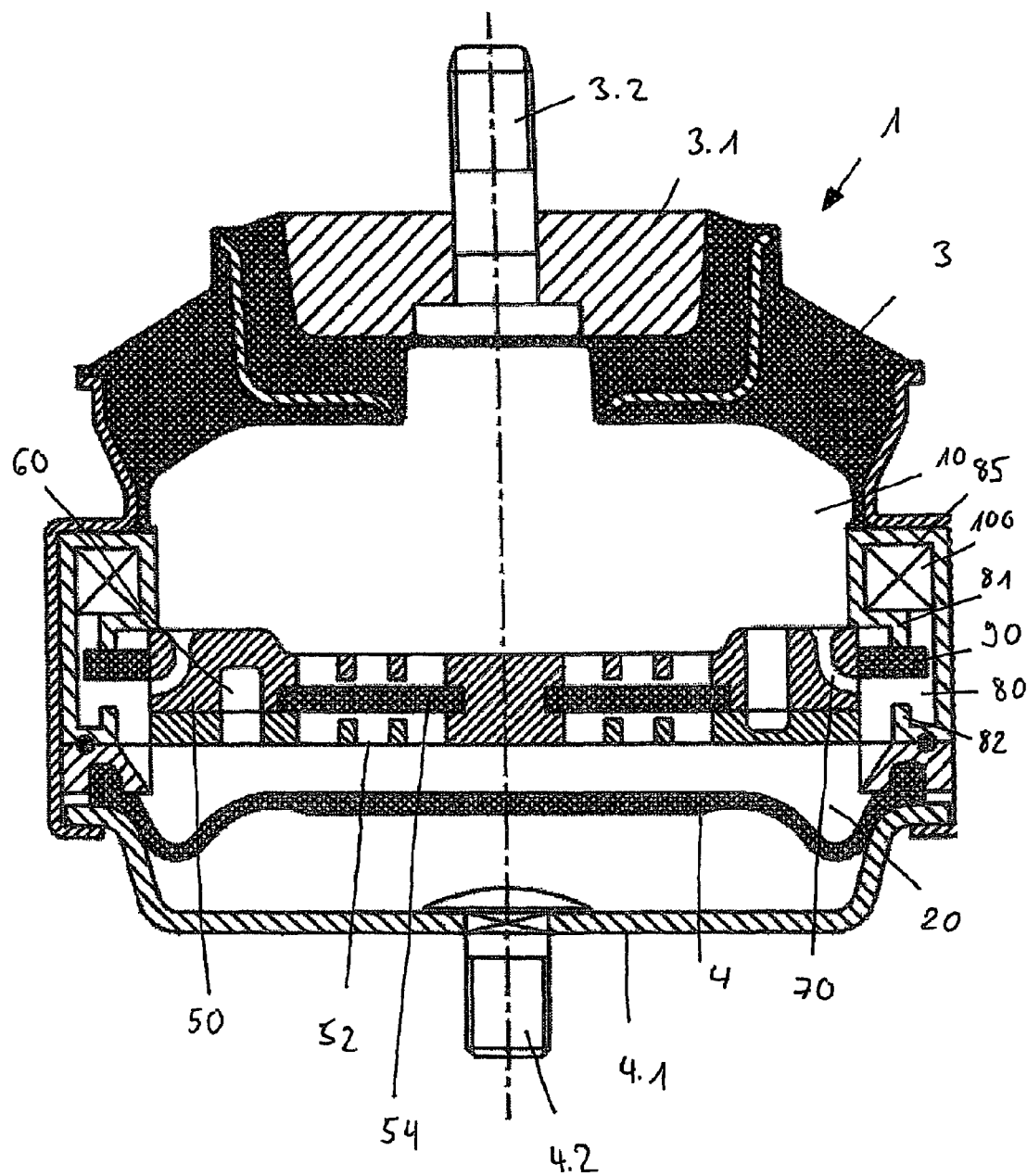

FIGS. 1a and 1b show a hydraulically damped assembly bearing 1 provided with a working chamber 10 and a compensation chamber 20 which are filled with a common hydraulic fluid. Working chamber 10 is limited by a wall 3 having a truncated conical shape and made of an elastic material, known as the bearing spring. Compensation chamber 20 is limited at the bottom by a cup-shaped wall 4, also made of an elastic material, for example by an air bellows capable of absorbing volume without creating pressure. On the side of the engine, a peripheral wall 3 receives a bearing plate 3.1. The plate is provided with a protruding screw bolt 3.2 for fastening to the engine. Between working chamber 10 and compensation chamber 20 is located a dividing wall 50 in which is disposed a membrane cage 52 for receiving a membrane 54. In the dividing wall 50 is also disposed a damping channel 60 which hydraulically interconnects the two liquid-filled chambers 10 and 20. The lower limiting wall 4 of compensation chamber 20 is surrounded by a housing 4.1 on which there is provided a vertically protruding screw bolt 4.2 for fastening assembly bearing 1 on the side of the vehicle body.

According to the invention, an additional damping channel 70 for quenching the idling-induced vibrations is disposed in dividing wall 50. It can be seen in the sectional representation of the present embodiment that the additional damping channel 70 makes an approximately 90° bend from the vertical to the horizontal direction and ends in connecting chamber 80 which provides the connection with compensation chamber 20. This means that in the embodiment shown, the additional damping channel 70 and the connecting chamber 80 constitute an annular slot in the form of a peripherally extending aperture. In connecting chamber 80 is located as a shut-off body a sealing ring 90 made of an elastomeric magnetic material. In connecting chamber 80, the sealing ring 90 is movable back and forth in the axial direction between an open position and a closed position between two studs 81, 82 that act as stops.

It can be seen from FIGS. 1a and 1b that the displacement path of sealing ring 90 extends vertically in the direction of the mouth of additional damping channel 70. It is made certain in this manner that sealing ring 90, even if subjected to a pressure stress, can continue to move through additional channel 70 virtually without force application, because the forces acting on the sealing ring from the side of the working chamber counterbalance each other. On the side of the compensation chamber, the build-up of a pressure gradient that could lead to troublesome forces is prevented by an air bellows 4 that is capable of absorbing volume without creating pressure. To actuate sealing ring 90 there is provided an electromagnet 100 which in correspondence with sealing ring 90 also extends peripherally and which is disposed in a chamber 85 that is directly adjacent to connecting chamber 80. In the closed position shown in FIG. 1, sealing ring 90 rests on the lower stud 82 and with its internal radial surface seals the additional damping channel 70 in liquid-tight manner.

The polarity reversal of the electromagnet puts sealing ring 90 into the open position represented in FIG. 1b. The ring 90 touches upper stud 81 thus freeing the passage opening of the additional damping channel 70 toward connecting chamber 80.

Because of its permanent magnetic properties, sealing ring 90 can be kept in the position shown without the need for a current.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A switchable assembly bearing with hydraulic damping, particularly for supporting drive assemblies and/or gearbox assemblies in motor vehicles, comprising:

at least one working chamber and one compensation chamber that are separated from one another by a dividing wall, said working chamber and said compensation chamber being hydraulically interconnected through a damping channel and at least one additional damping channel that are formed in said dividing wall, said additional damping channel being arcuately formed in said dividing wall and hydraulically interconnecting said working chamber and said compensation chamber through a connecting chamber, said connecting chamber housing a shut-off body separate and apart from said dividing wall that is displaceable from a first position that enables fluid communication through said connecting chamber and a second position that closes said additional damping channel to disable fluid communication through said connecting chamber, wherein said additional damping channel is configured and disposed relative to a symmetry axis of the bearing so that forces acting on said shut-off body through a hydraulic liquid counterbalance each other.

2. The switchable assembly bearing according to claim 1, wherein said additional damping channel and said connecting chamber form a radially surrounding annular slot with a passage opening disposed radially relative to said symmetry axis and directed toward said compensation chamber; and said shut-off body is formed by a sealing ring disposed at said passage opening and is displaceable along a displacement path that extends vertical to said passage opening between said first position and said second position.

3. The switchable assembly bearing according to claim 2, wherein said passage opening points radially outward.

4. The switchable assembly bearing according to claim 1, wherein said shut-off body comprises a permanently magnetic material and the bearing further comprises a device for actuating said shut-off body by magnetic forces.

5. The switchable assembly bearing according to claim 4, wherein the device for actuating the shut-off body is an electromagnet.

6. The switchable assembly bearing according to claim 5, wherein at least segments of the electromagnet are also ring-shaped.

7. The switchable assembly bearing according to claim 5, wherein the electromagnet is disposed in a chamber adjacent to the connecting chamber containing the shut-off body and which provides a connection with the compensation chamber.

8. The switchable assembly bearing according to claim 4, wherein the shut-off body is made of a magnetic elastomer.

9. The switchable assembly bearing according to claim 1, wherein the additional damping channel for decoupling and quenching low-frequency, high-amplitude vibrations is designed for an idling drive assembly.

10. The switchable assembly bearing according to claim 1, further comprising a decoupling device for quenching and damping high-frequency, low-amplitude acoustic vibrations.

11. A bearing assembly comprising:

a working chamber;

a compensation chamber in fluid communication with said working chamber through a first damping channel; and a connecting chamber fluidly connecting said working chamber and said compensation chamber through an arcuately formed second damping channel;

wherein said first and second damping channels are formed in a dividing wall that separates said working chamber and said compensation chamber;

said connecting chamber includes a sealing ring separate and apart from said dividing wall that is movable between an open position and a closed position such that said sealing ring can open and close said second damping channel of said dividing wall.

12. The bearing assembly according to claim 11, further comprising an electromagnet disposed in said connecting chamber.

13. The bearing assembly according to claim 12, wherein said electromagnet moves said sealing ring between said open and said closed position.

14. The bearing assembly according to claim 11, wherein said sealing ring is comprised of a magnetic elastomer.

* * * * *